(12) United States Patent
Liu et al.

(10) Patent No.: US 10,480,629 B2
(45) Date of Patent: Nov. 19, 2019

(54) BALL SCREW WITH A DUSTPROOF MEMBER

(71) Applicant: HIWIN TECHNOLOGIES CORP., Taichung (TW)

(72) Inventors: Wei-Lun Liu, Taichung (TW); Sheng-Hao Hong, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 280 days.

(21) Appl. No.: 15/656,765

(22) Filed: Jul. 21, 2017

(65) Prior Publication Data
US 2019/0024766 A1    Jan. 24, 2019

(51) Int. Cl.
*F16H 25/24* (2006.01)
*F16H 25/22* (2006.01)

(52) U.S. Cl.
CPC ..... *F16H 25/2418* (2013.01); *F16H 25/2204* (2013.01)

(58) Field of Classification Search
CPC ......................... F16H 25/2418; F16H 25/2204
See application file for complete search history.

(56) References Cited

U.S. PATENT DOCUMENTS

| | | | |
|---|---|---|---|
| 2,818,745 A * | 1/1958 | Spontelli | F16H 25/2418 74/89.4 |
| 7,430,933 B2 | 10/2008 | Yatsushiro et al. | |
| 2002/0036384 A1 * | 3/2002 | Nakagawa | F16H 25/2418 277/628 |
| 2002/0144560 A1 * | 10/2002 | Yatsushiro | F16H 25/2418 74/89.4 |
| 2012/0060631 A1 * | 3/2012 | Hsieh | F16H 25/2204 74/89.4 |
| 2015/0233457 A1 * | 8/2015 | Heck | F16H 25/2418 74/89.4 |
| 2017/0268644 A1 * | 9/2017 | Teng | F16H 25/2204 |
| 2018/0142767 A1 * | 5/2018 | Teng | F16H 25/2418 |

FOREIGN PATENT DOCUMENTS

| | | |
|---|---|---|
| CN | 203115034 U | 8/2013 |
| DE | 10026238 A1 | 6/2001 |
| JP | 2011-247404 A | 12/2011 |
| JP | 2012-7685 A | 1/2012 |
| JP | 5192074 B2 | 5/2013 |
| JP | 2017-106529 A | 6/2017 |
| TW | 201315914 A | 4/2013 |
| TW | 455097 U1 | 6/2013 |

* cited by examiner

*Primary Examiner* — Terence Boes
(74) *Attorney, Agent, or Firm* — Wang Law Firm, Inc.

(57) ABSTRACT

A ball screw with a dustproof member includes: a screw, a nut and the dustproof member. The dustproof member is inserted along the axis into the annular receiving groove and sleeved onto the screw, and includes an annular first dustproof portion and an arc-shaped second dustproof portion. The annular first dustproof portion includes a dustproof hole for insertion of the screw, the dustproof hole has a dustproof inner surface defining an clearance relative to the circumferential surface of the screw, the arc-shaped second dustproof portion protrudes from the dustproof inner surface, and includes an arc-shaped dustproof section contacting the outer helical groove. Such arrangements provide a dustproof effect and prevent overstress on the screw, consequently decreasing friction resistance, thus making the assembly easier and reducing the required starting torque.

6 Claims, 11 Drawing Sheets

BALL SCREW WITH A DUSTPROOF MEMBER

BACKGROUND

Field of the Invention

The present invention relates to a ball screw, and more particularly to a ball screw with a dustproof member.

Related Prior Art

FIG. 1A shows a "dustproof member for a ball screw" disclosed in Taiwan Patent Application No. 100136776, wherein the dustproof member 11 is disposed on a screw, and includes a dustproof hole 111, and a dustproof lip 112 disposed on the inner surface of the dustproof hole 111 and shaped complementary to the outer helical groove 121 of the screw 12. The structure design of the dustproof lip 112 simplifies the structure and manufacturing of the dustproof member 11, and improves the assembly efficiency of the ball screw and nut. However, the inner surface of the dustproof hole 111 of the dustproof member 11 is in close contact with the circumferential surface 122 of the screw 12, and the dustproof lip 112 is in full-tooth contact with the outer helical groove 121 of the screw 12, as a result, hands will feel heavy when assembling the dustproof member, which makes it difficult for the dustproof member's tooth come into engagement with the screw, consequently makes the assembling difficult, and at the same time increases the required starting torque of ball screw.

FIG. 1B shows a ball screw with a dustproof member 14 disclosed in U.S. Pat. No. 7,430,933B2, a spring 15 is elastically pressed against the dustproof lip 141 so as to produce an effect of oil seal and dust prevention. However, in addition to coming into a full-tooth contact with the outer helical groove 161 of the screw 16, the dustproof lip 141 of the dustproof member 14 is pushed by the spring 15 into tight contact with the outer helical groove 161 of the screw 16, which will increase the required torque for starting the ball screw.

FIG. 1C shows a ball screw with a dustproof member disclosed in JP Patent No. JP 5192074B2, the dustproof member 18 is provided with two dustproof lips 181, 182 for contacting the circumferential surface 191 of the screw 19. However, too much structure design makes the assembly too complicated, and too many contact portions will increase the required torque for starting the ball screw.

The present invention has arisen to mitigate and/or obviate the afore-described disadvantages.

SUMMARY

One objective of the present invention is to provide a ball screw with a dustproof member, which is easy to assemble and can reduce the starting torque.

To achieve the above objective, a ball screw with a dustproof member in accordance with the invention, comprises: a screw including an axis, a circumferential surface surrounding the axis, and an outer helical groove helically formed in the circumferential surface to surround the axis; a nut sleeved along the axis onto the screw, and including: an inner helical groove helically defined in an inner surface of the nut to surround the axis, and an annular receiving groove formed at one end of the nut and concaved along the axis, wherein the inner helical groove and the outer helical groove form a load path for receiving a plurality of rolling balls; and the dustproof member inserted along the axis into the annular receiving groove and sleeved onto the screw, and including an annular first dustproof portion and an arc-shaped second dustproof portion. The annular first dustproof portion includes a dustproof hole for insertion of the screw, the dustproof hole has a dustproof inner surface defining an clearance relative to the circumferential surface of the screw, the arc-shaped second dustproof portion protrudes from the dustproof inner surface, and includes an arc-shaped dustproof section contacting the outer helical groove.

Preferably, the clearance between the dustproof inner surface of the dustproof member and the circumferential surface of the screw is 0.05 mm to 0.3 mm, which can reduce the starting torque while maintaining a preferable dustproof effect.

Preferably, the second dustproof portion includes an arc-shaped first side surface and an opposite arc-shaped second side surface, and a distance between the arc-shaped first side surface and the arc-shaped second side surface along the axis is smaller than a width of the outer helical groove, which can further reduce the starting torque.

Preferably, the arc-shaped dustproof section of the second dustproof portion has a radian larger than 180 degrees, the second dustproof portion includes an arc-shaped first side surface and an opposite arc-shaped second side surface, and a distance between the arc-shaped first side surface and the arc-shaped second side surface along the axis is 0.5 mm to 1 mm, which makes the dustproof member easy to assemble and provides a prestress.

Preferably, the arc-shaped dustproof section of the second dustproof portion has a radian smaller than 180 degrees, the second dustproof portion includes an arc-shaped first side surface and an opposite arc-shaped second side surface, and a distance between the arc-shaped first side surface and the arc-shaped second side surface along the axis is 2 to 3 mm.

Preferably, a washer is disposed between the dustproof member and the nut.

Preferably, the dustproof member is made of rubber or plastic, which provide sufficient deformation space for the dustproof member, consequently facilitating repeated assembly and disassembly of the dustproof member.

The first dustproof portion of each of the dustproof members is located a clearance away from the circumferential surface of the screw, and therefore will not produce a stress on the screw, which consequently prevents the increase of friction while making it easier to assemble the dustproof members. Furthermore, the second dustproof portion is arc-shaped and contacts the outer helical groove of the screw in an arc-shaped contact manner, which provides a dustproof effect and prevents overstress on the screw, thus effectively decreasing friction resistance. Hence, the present invention surely can make the assembly easier and reduces the required starting torque.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1A:
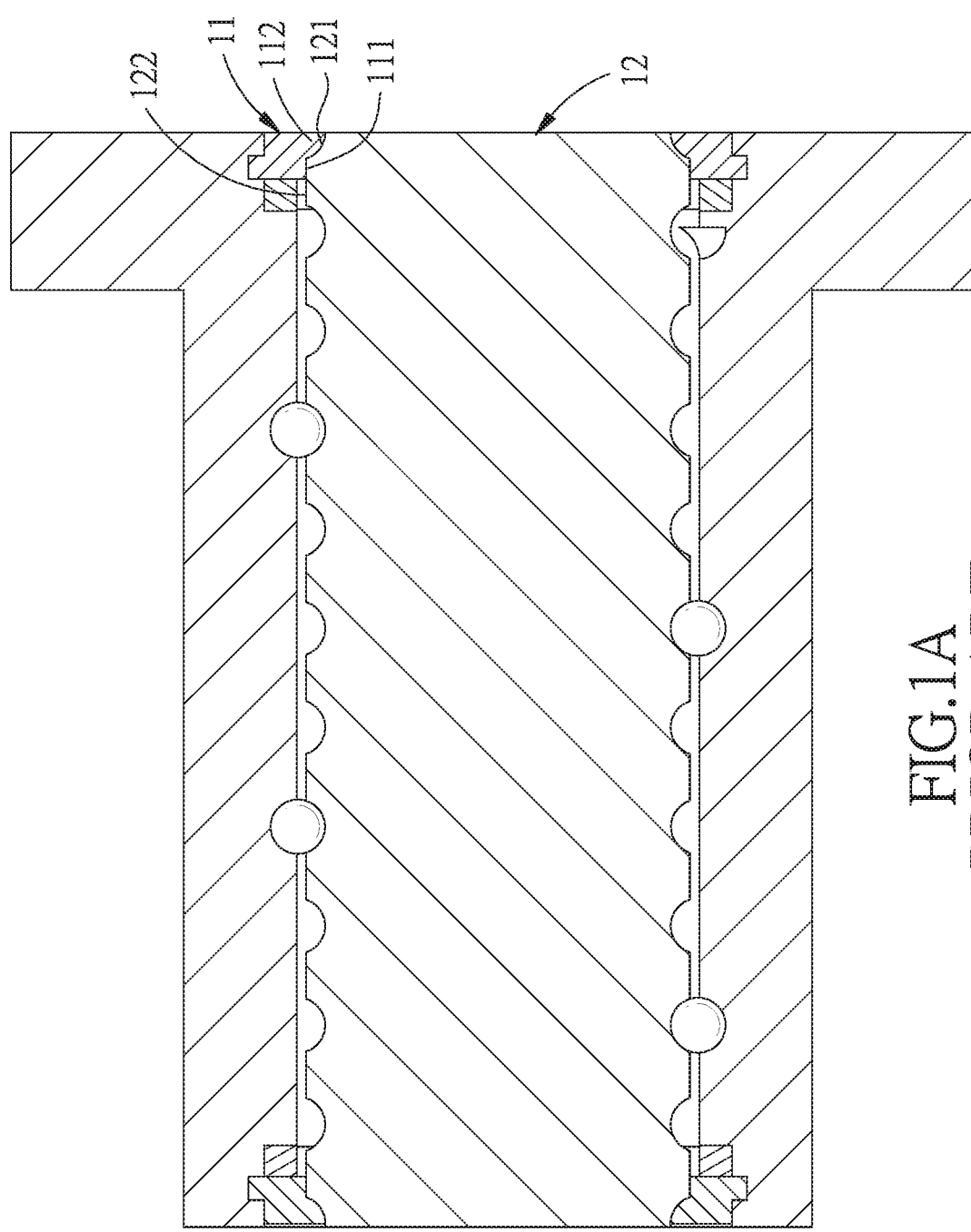
FIG. 1A shows a "dustproof member for a ball screw" disclosed in Taiwan Patent Application No. 100136776.
Figure 1B:
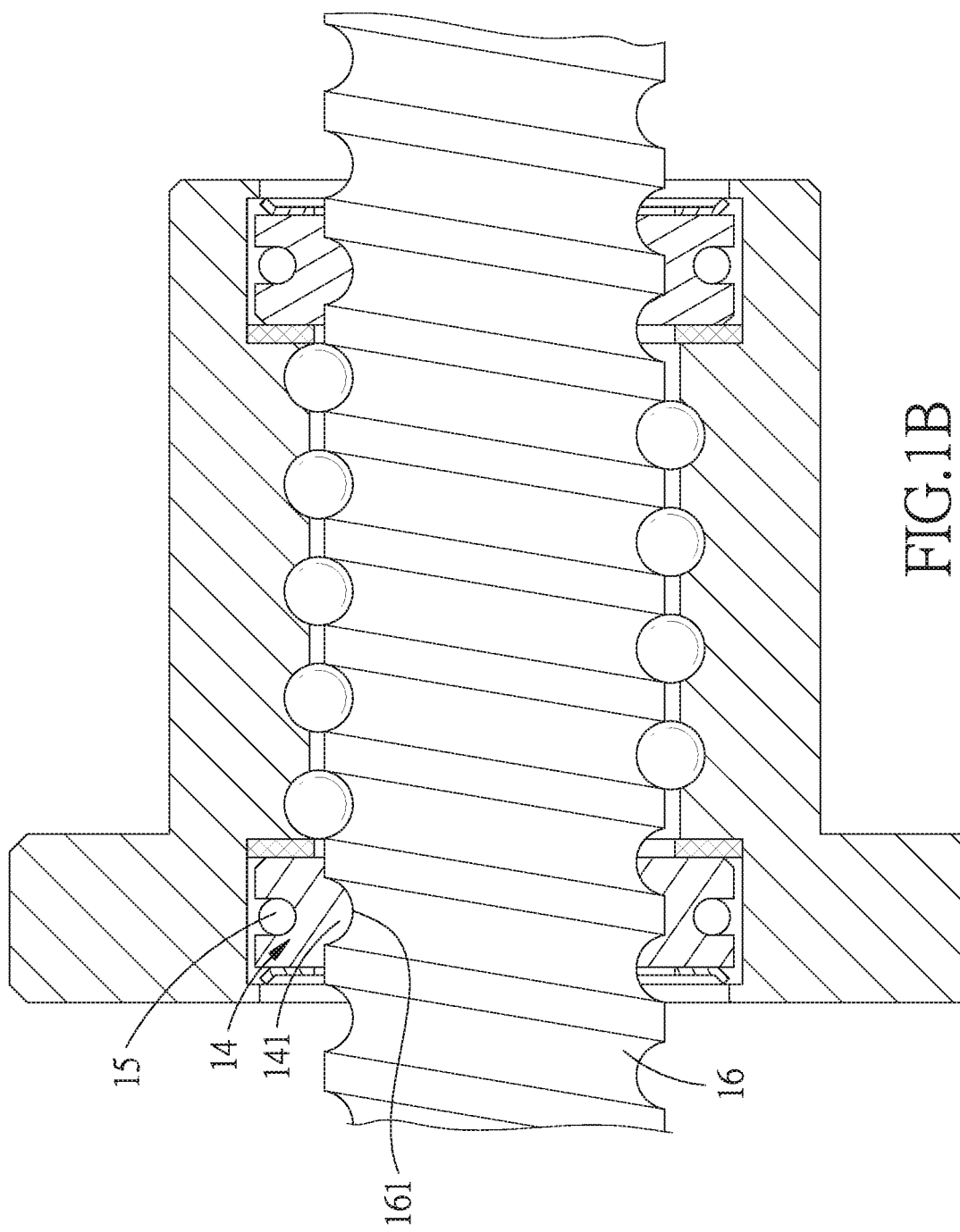
FIG. 1B shows a ball screw with a dustproof member 14 disclosed in U.S. Pat. No. 7,430,933B2.
Figure 1C:
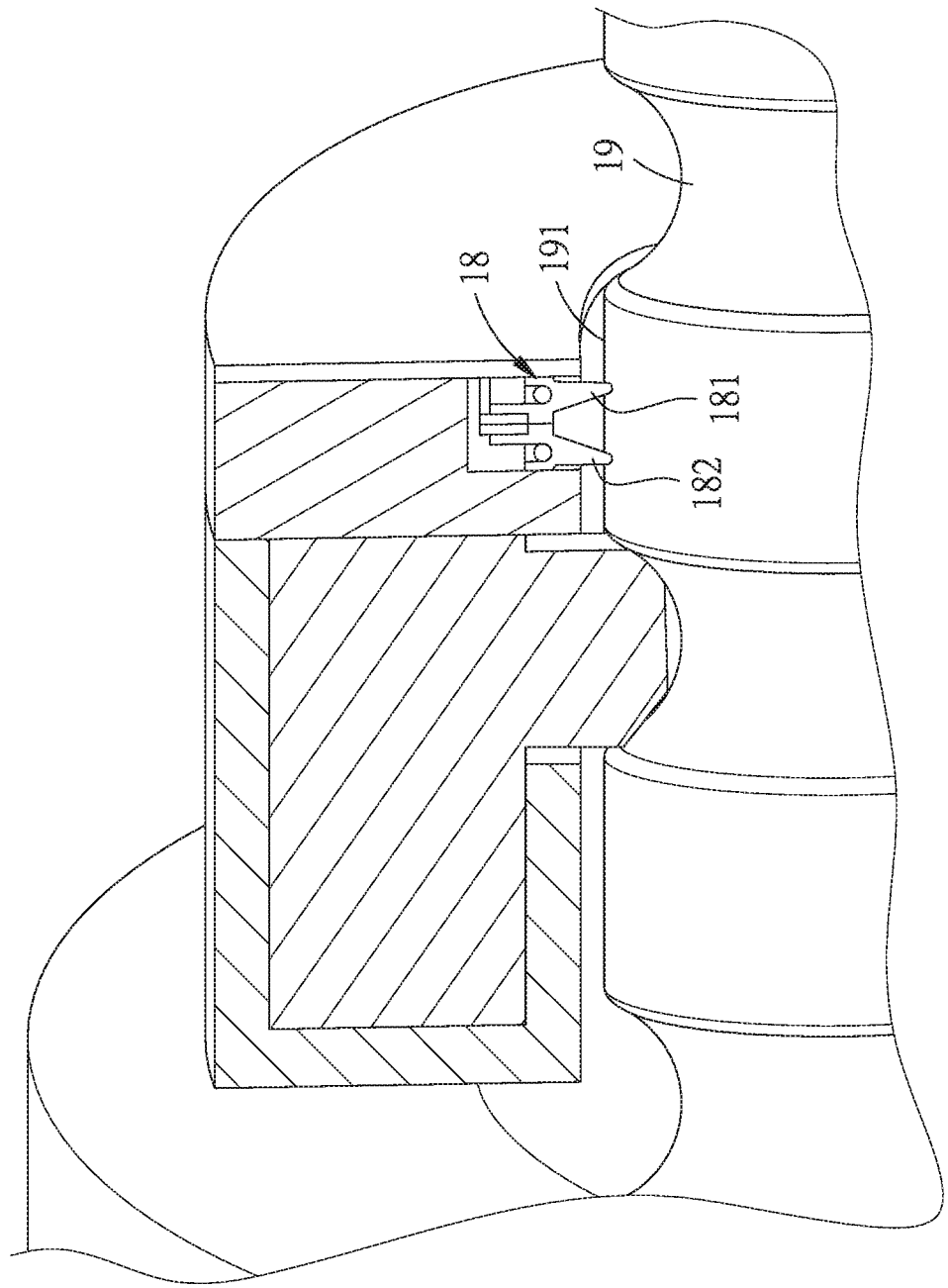
FIG. 1C shows a ball screw with a dustproof member disclosed in JP Patent No. JP 5192074B2.
Figure 2:
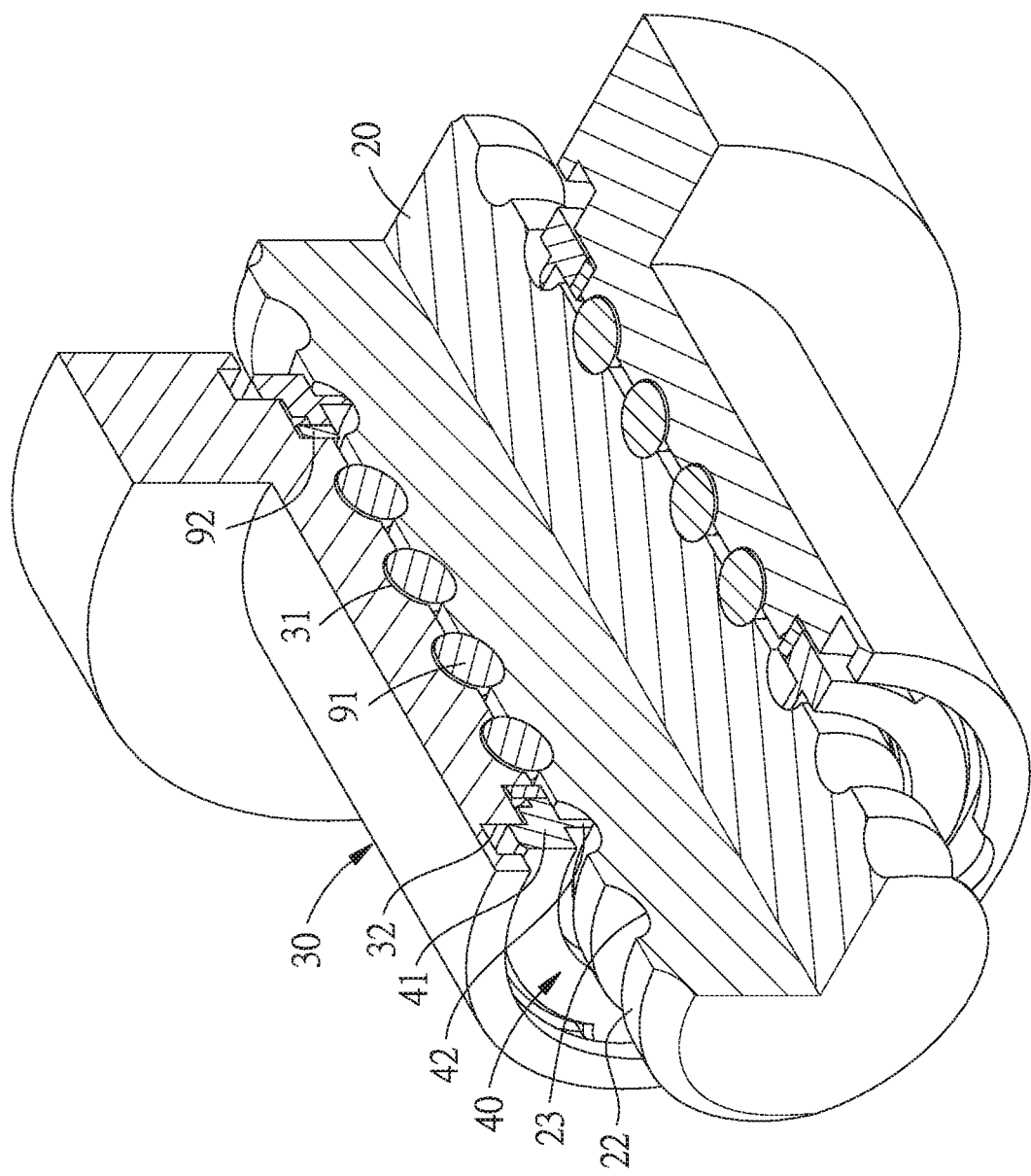
FIG. 2 is a partial cross sectional view of a ball screw with a dustproof member in accordance with a first preferred embodiment of the present invention.
Figure 3:
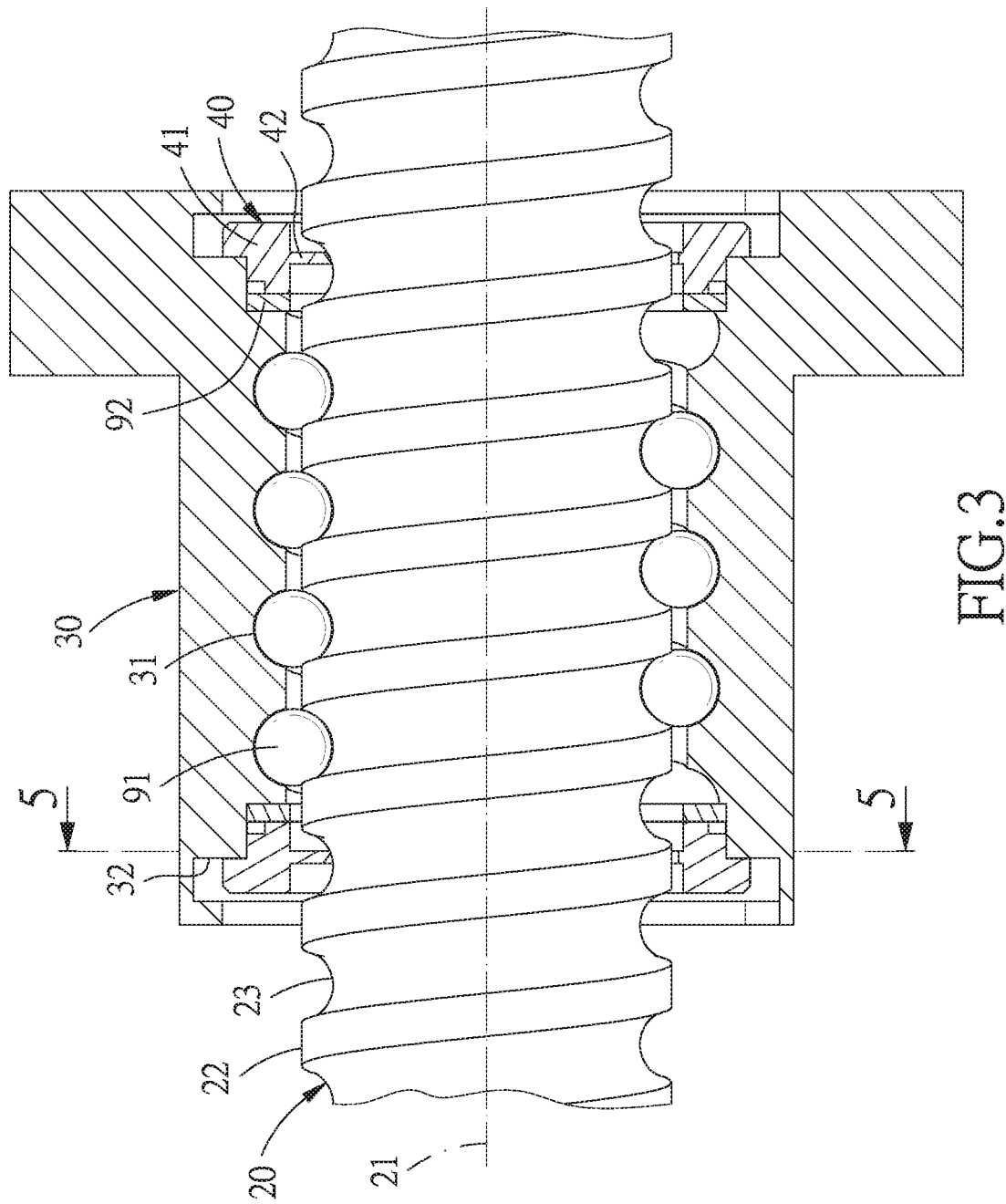
FIG. 3 is a cross sectional view of the ball screw with a dustproof member in accordance with the first preferred embodiment of the present invention.
Figure 4:
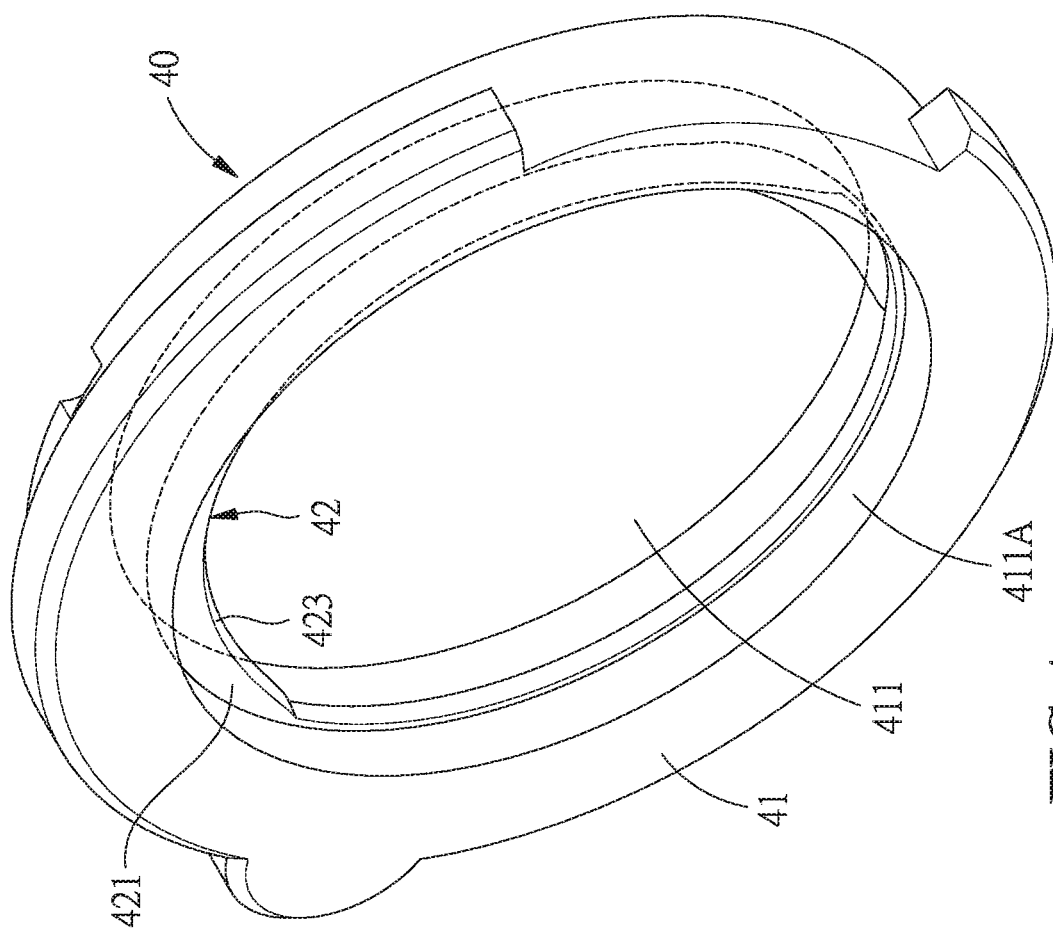
FIG. 4 shows a dustproof member in accordance with the first preferred embodiment of the present invention.
Figure 5:
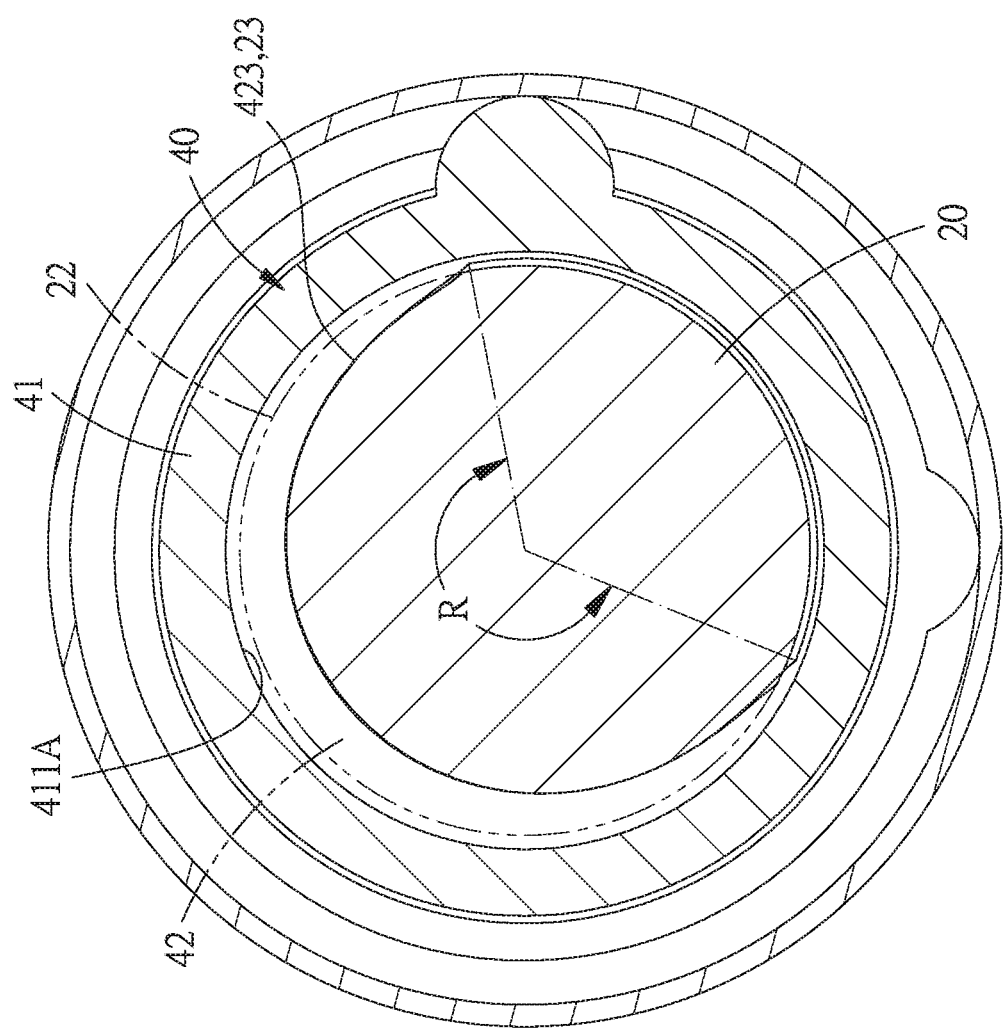
FIG. 5 is a cross sectional view taken along the line 5-5 of FIG. 3.
Figure 6:
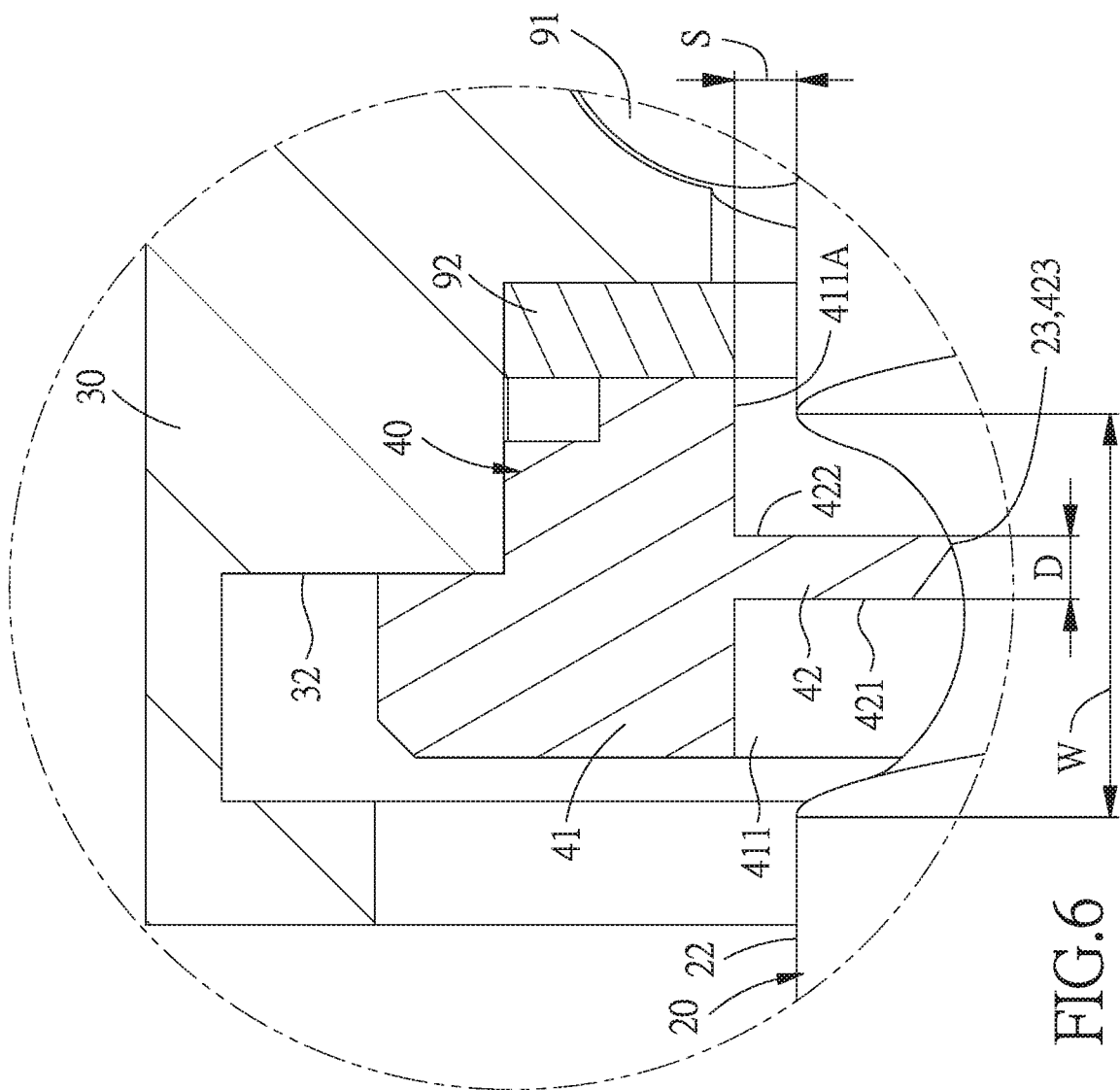
FIG. 6 is an enlarged view of a part of FIG. 3.

The present invention will be clearer from the following description when viewed together with the accompanying drawings, which show, for purpose of illustrations only, the preferred embodiment in accordance with the present invention.

In the following description, similar elements are labeled with identical reference numbers.

Referring to FIGS. 2-6, the ball screw with a dustproof member in accordance with the first preferred embodiment of the present invention, comprises: a screw 20, a nut 30, and two such dustproof members 40.

The screw 20 includes an axis 21, a circumferential surface 22 surrounding the axis 21, and an outer helical groove 23 helically formed in the circumferential surface 22 to surround the axis 21.

The nut 30 is sleeved along the axis 21 onto the screw 20, and includes: an inner helical groove 31 helically defined in an inner surface of the nut 30 to surround the axis 21, and two annular receiving grooves 32 formed at two ends of the nut 30 and concaved along the axis 21. The inner helical groove 31 and the outer helical groove 23 form a load path for receiving a plurality of rolling balls 91.

The screw 20, the nut 30 and the rolling balls 91 are assembled and operated in conventional ways, and this is also not the point of the invention, therefore, the structure of the screw 20, the nut 30 and the rolling balls 91, and the ways in which they are assembled and operated are not elaborated any further.

The two dustproof members 40 are inserted along the axis 21 into the two annular receiving grooves 32 and sleeved onto the screw 20, and each include: an annular first dustproof portion 41 and an arc-shaped second dustproof portion 42. The first dustproof portion 41 includes a dustproof hole 411 for insertion of the screw 20, and the dustproof hole 411 has a dustproof inner surface 411A defining an clearance S relative to the circumferential surface 22 of the screw 20. The second dustproof portion 42 protrudes toward the axis 21 from the dustproof inner surface 411A, and includes: an arc-shaped first side surface 421, an opposite arc-shaped second side surface 422, and an arc-shaped dustproof section 423 connected between the arc-shaped first and second side surfaces 421, 422 and contacting the outer helical groove 23. In this embodiment, a washer 92 is disposed between each of the dustproof members 40 and the nut 30, and the dustproof members 40 are made of rubber (or plastic). The clearance S between the dustproof inner surface 411A of each of the dustproof members 40 and the circumferential surface 22 of the screw 20 is, but not limited to, 0.2 mm, and can also be 0.05 mm to 0.3 mm. Besides, in this embodiment, the arc-shaped dustproof section 423 of the second dustproof portion 42 has a radian R of 237 degrees, and the radian R is not limited to this, and can be any degrees as along as it is larger than 180 degrees and smaller than 360 degrees. Besides, a maximum distance D between the arc-shaped first side surface 421 and the arc-shaped second side surface 422 is, but not limited to, 0.5 mm, and can also be 0.5 mm to 1 mm. In other words, in this embodiment, the arc-shaped dustproof section 423 for contacting the outer helical groove 23 has a width D of at least 0.5 mm to contact the outer helical groove 23, and the distance D between the arc-shaped first side surface 421 and the arc-shaped second side surface 422 along the axis 21 is smaller than a width W of the outer helical groove 23.

What mentioned above are the structural relations of the main parts of the first embodiment, and the function and feature of the invention are described as follows.

The first dustproof portion 41 of each of the dustproof members 40 is located a clearance S away from the circumferential surface 22 of the screw 20, and therefore will not produce a stress on the screw 20, which consequently prevents the increase of friction while making it easier to assemble the dustproof members 40. Furthermore, the second dustproof portion 42 is arc-shaped and contacts the outer helical groove 23 of the screw 20 in an arc-shaped contact manner, which provides a dustproof effect and prevents overstress on the screw 20, thus effectively decreasing friction resistance. Hence, the present invention surely can make the assembly easier and reduces the required starting torque.

It is to be noted that, in this embodiment, the clearance S between the dustproof inner surface 411A of the respective dustproof members 40 and the circumferential surface 22 of the screw 20 is set at 0.2 mm, which, in addition to making the assembly easier and reducing the required starting torque of the screw, also blocks the large-sized dust or iron particles, so as to carry out a first dustproof operation, meanwhile, it further prevents the large-sized dust or iron particles from damaging the second dustproof portion 42.

Besides, in this embodiment, the second dustproof portion 42 of each of the dustproof members 40 is designed to have the arc-shaped dustproof section 423 contacting the outer helical groove 23 of the screw 20, which effectively stops smaller dust from passing through the dustproof members 40 and sticking to the rolling balls 91, and thus a second dustproof operation is carried out. Meanwhile, the dustproof members 40 are made of rubber (or plastic), the radian R of the arc-shaped dustproof section 423 of the second dustproof portion 42 is set at 237 degrees, and the width of the arc-shaped dustproof section 423 is set at 0.5 mm, which is way smaller than the width W of the outer helical groove 23, therefore, the dustproof member has sufficient deformation space to facilitate repeated assembly and disassembly. After assembly, the arc-shaped dustproof section 423 of the second dustproof portion 42 comes into contact with the outer helical groove 23, which provides a light stress on the screw 20.

Figure 7:
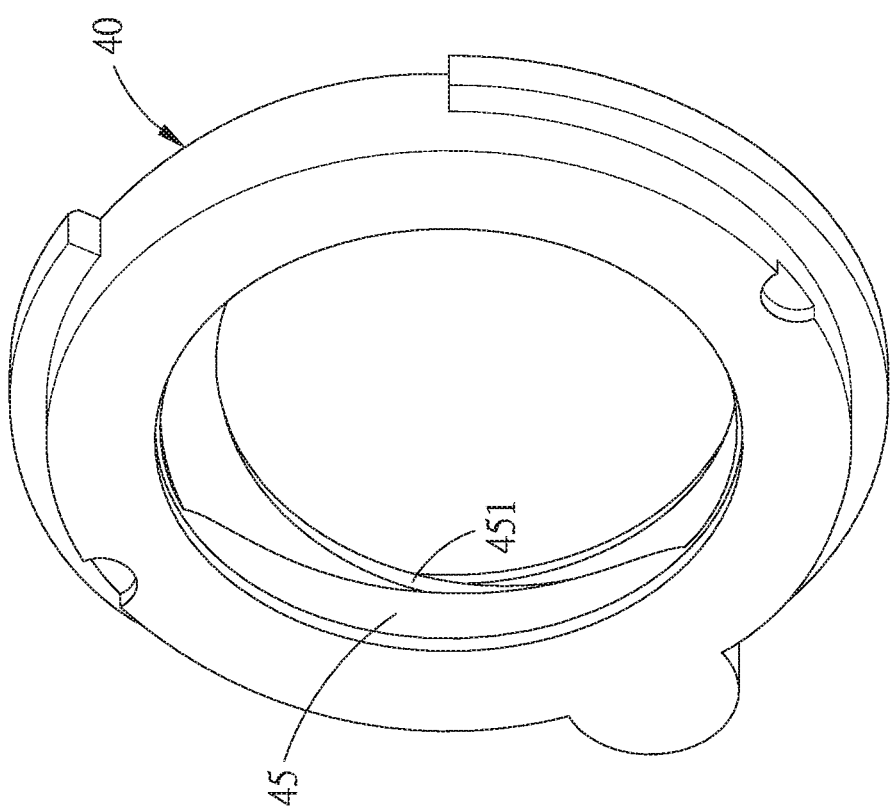
FIG. 7 shows a dustproof member in accordance with a second preferred embodiment of the present invention.
Figure 8:
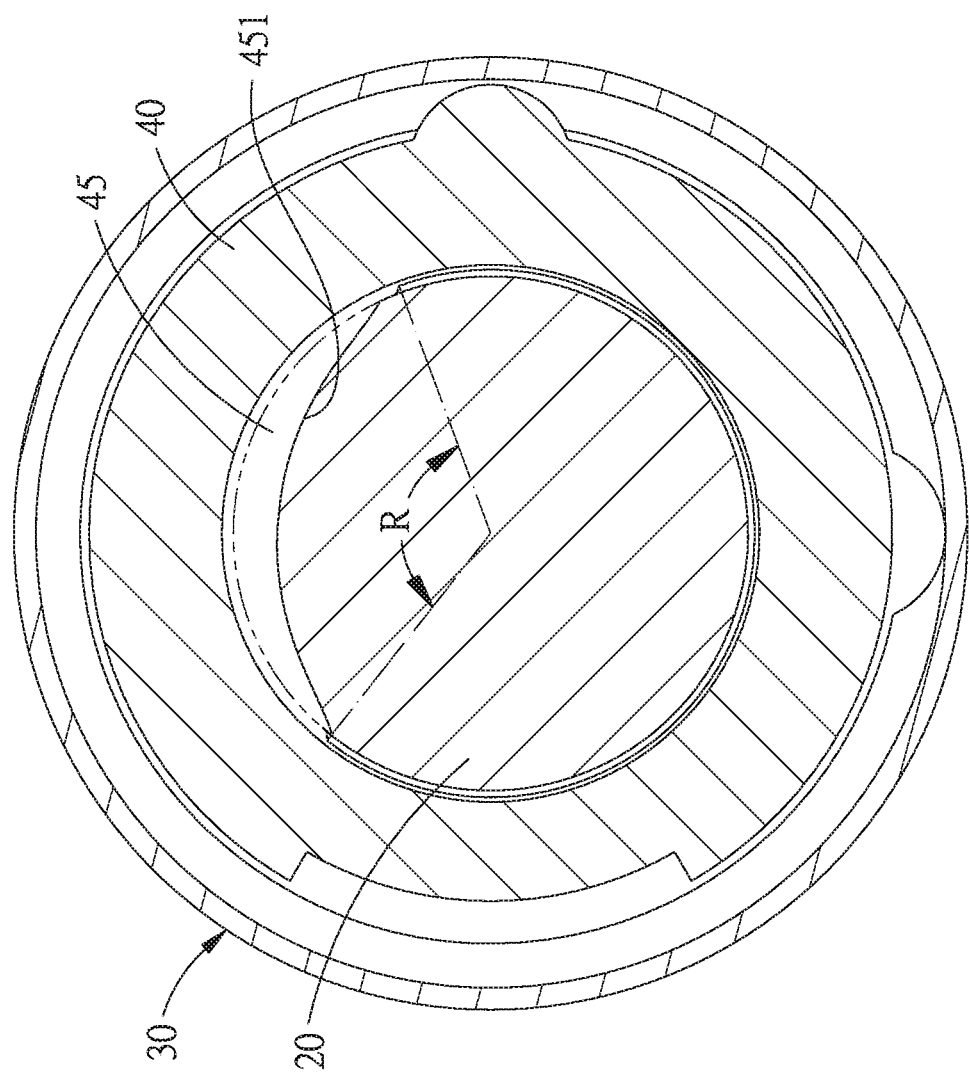
FIG. 8 is a cross sectional view of the ball screw with a dustproof member in accordance with the second preferred embodiment of the present invention.
Figure 9:
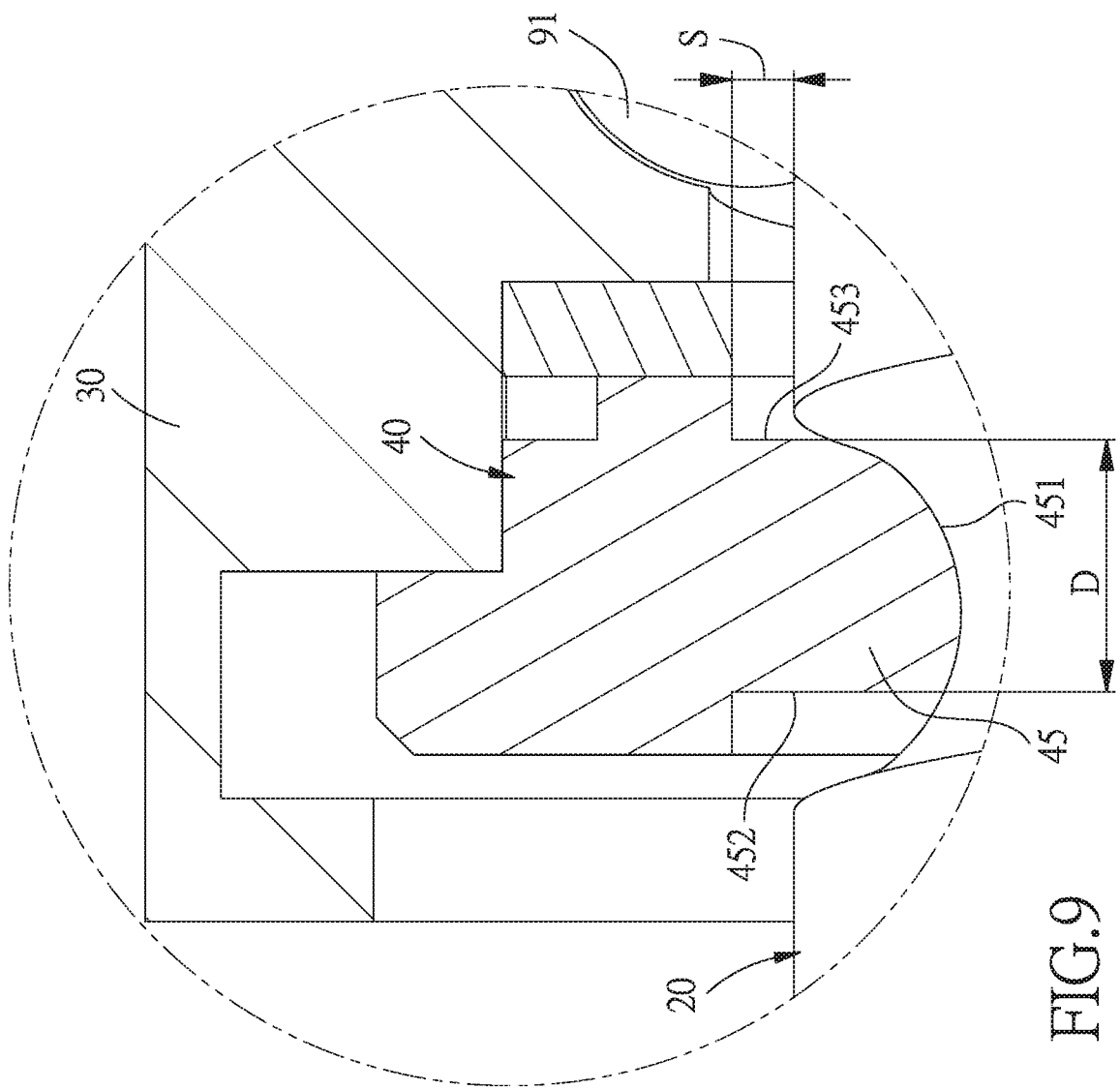
FIG. 9 is a cross sectional view of a part of the of the ball screw with a dustproof member in accordance with the second preferred embodiment of the present invention, which is similar to FIG. 6.

Referring to FIGS. 7-9, a ball screw with a dustproof member in accordance with the second preferred embodiment of the present invention is similar to the first embodiment, and also comprises: the screw 20, the nut 30 and the dustproof members 40, except that:

The radian R of the arc-shaped dustproof section 451 of the second dustproof portion 45 of each of the dustproof members 40 is set at 121 degrees, and the maximum distance D between the arc-shaped first side surface 452 and the arc-shaped second side surface 453 along the axis 21 is 2 mm, but not limited to this, it is ok when the radian R is smaller than 180 degrees, and the distance D ranges from 2 mm to 3 mm. In addition to making the assembly easier and reducing the required starting torque of the screw, the second embodiment can also reduce the necessary material required for production, consequently decrease the production cost.

While we have shown and described various embodiments in accordance with the present invention, it is clear to those skilled in the art that further embodiments may be made without departing from the scope of the present invention.

What is claimed is:

1. A ball screw with a dustproof member, comprising:
   a screw including an axis, a circumferential surface surrounding the axis, and an outer helical groove helically formed in the circumferential surface to surround the axis;
   a nut sleeved along the axis onto the screw, and including:
      an inner helical groove helically defined in an inner surface of the nut to surround the axis, and an annular receiving groove formed at one end of the nut and concaved along the axis, wherein the inner helical groove and the outer helical groove form a load path for receiving a plurality of rolling balls;
   the dustproof member being inserted along the axis into the annular receiving groove and sleeved onto the screw, and including an annular first dustproof portion and an arc-shaped second dustproof portion, wherein the annular first dustproof portion includes a dustproof hole for insertion of the screw, the dustproof hole has a dustproof inner surface defining an clearance relative to the circumferential surface of the screw, the arc-shaped second dustproof portion protrudes from the dustproof inner surface, and includes an arc-shaped dustproof section contacting the outer helical groove;
   the clearance between the dustproof inner surface of the dustproof member and the circumferential surface of the screw is 0.05 mm to 0.3 mm, the arc-shaped dustproof section of the second dustproof portion has a radian larger than 180 degrees, the second dustproof portion includes an arc-shaped first side surface and an opposite arc-shaped second side surface, and a distance between the arc-shaped first side surface and the arc-shaped second side surface along the axis is 0.5 mm to 1 mm.

2. The ball screw as claimed in claim 1, wherein the second dustproof portion includes an arc-shaped first side surface and an opposite arc-shaped second side surface, and a distance between the arc-shaped first side surface and the arc-shaped second side surface along the axis is smaller than a width of the outer helical groove.

3. A ball screw with a dustproof member, comprising:
   a screw including an axis, a circumferential surface surrounding the axis, and an outer helical groove helically formed in the circumferential surface to surround the axis;
   a nut sleeved along the axis onto the screw, and including:
      an inner helical groove helically defined in an inner surface of the nut to surround the axis, and an annular receiving groove formed at one end of the nut and concaved along the axis, wherein the inner helical groove and the outer helical groove form a load path for receiving a plurality of rolling balls;
   the dustproof member being inserted along the axis into the annular receiving groove and sleeved onto the screw, and including an annular first dustproof portion and an arc-shaped second dustproof portion, wherein the annular first dustproof portion includes a dustproof hole for insertion of the screw, the dustproof hole has a dustproof inner surface defining an clearance relative to the circumferential surface of the screw, the arc-shaped second dustproof portion protrudes from the dustproof inner surface, and includes an arc-shaped dustproof section contacting the outer helical groove;
   wherein the clearance between the dustproof inner surface of the dustproof member and the circumferential surface of the screw is 0.05 mm to 0.3 mm, the arc-shaped dustproof section of the second dustproof portion has a radian smaller than 180 degrees, the second dustproof portion includes an arc-shaped first side surface and an opposite arc-shaped second side surface, and a distance between the arc-shaped first side surface and the arc-shaped second side surface along the axis is 2 to 3 mm.

4. The ball screw as claimed in claim 3, wherein a washer is disposed between the dustproof member and the nut.

5. The ball screw as claimed in claim 3, wherein the dustproof member is made of rubber or plastic.

6. The ball screw as claimed in claim 3, wherein the second dustproof portion includes an arc-shaped first side surface and an opposite arc-shaped second side surface, and a distance between the arc-shaped first side surface and the arc-shaped second side surface along the axis is smaller than a width of the outer helical groove.

* * * * *